W. W. DUTCHER.
LOOM-TEMPLE.
No. 6,931. Reissued Feb. 15, 1876.
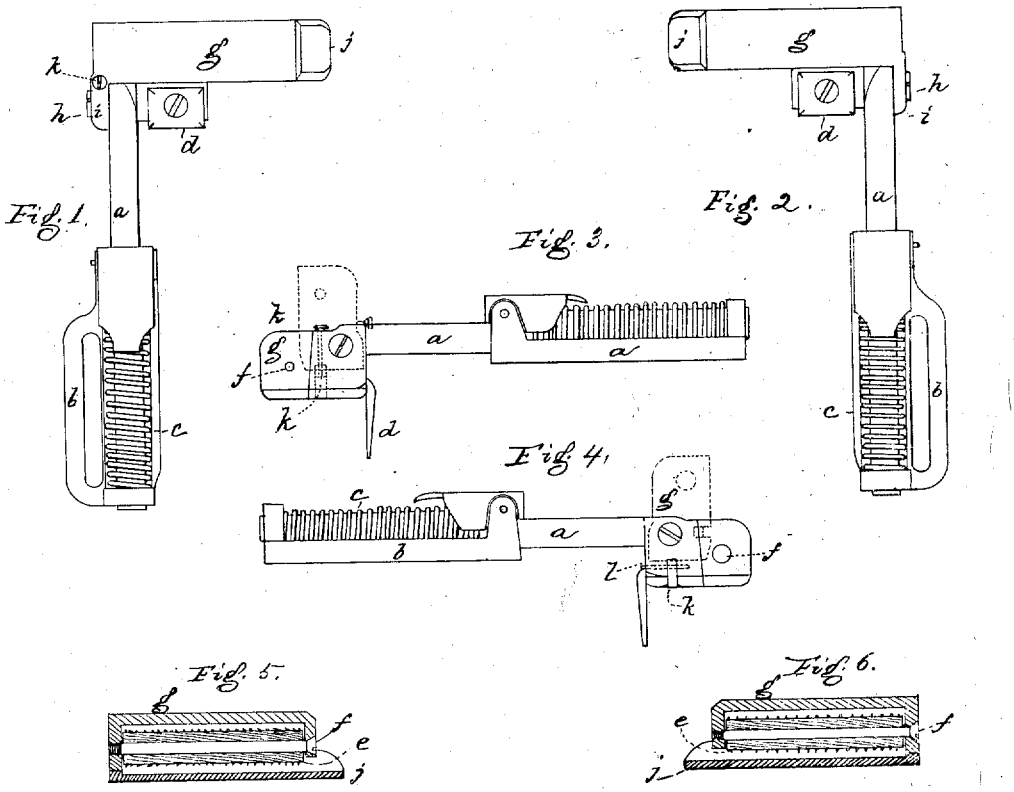
Witnesses.
L. H. Latimer.
W. J. Pratt.
Inventor.
Warren W. Dutcher
per Lemuel Gregory Atty's.

UNITED STATES PATENT OFFICE.

WARREN WHITNEY DUTCHER, OF HOPEDALE, MASSACHUSETTS.

IMPROVEMENT IN LOOM-TEMPLES.

Specification forming part of Letters Patent No. 106,038, dated August 2, 1870; reissue No. 6,931, dated February 15, 1876; application filed February 7, 1876.

*To all whom it may concern:*

Be it known that I, WARREN WHITNEY DUTCHER, of Hopedale, Worcester-county, in the State of Massachusetts, have invented Improvements in Loom-Temples, of which the following is a specification:

This invention relates to that class of loom-temples known as roller-temples, and adapted to be moved by the lay; and the invention consists, mainly, in the combination, in such a temple, of a trough and a toothed roller and cap, hinged together and made movable with relation to each other, to permit the introduction or removal of the cloth, or of the roller, with a bolt or catch to hold the roller and trough in operative position.

Figures 1 and 2 are top views of a pair of loom-temples, one being a right and the other a left hand temple. Figs. 3 and 4 are side views thereof. Fig. 5 is a vertical section of one temple, taken in range of the axis of its spindle. Fig. 6 is a similar section of the other temple. Fig. 7 is an under side view of the right temple of the pair. Fig. 8 is a cross-section of it, taken through its bolt or latch. Fig. 9 is a section of the left temple, taken through its bolt.

The stock or bar *a* of the temple, held and guided in the stand *b*, is provided with a spring, *c*, and a heel, *d*, to enable the temple to be reciprocated by the lay, as usual. Each temple has a toothed cylinder or roller, *e*, arranged on its pin or journal, *f*, fixed to the cap or cover *g*, hinged or pivoted, in this instance, to the bar *a*, at *h*, the screw connecting the cap, or cover, and bar passing through a projection, *i*, in the cap and into the bar, the projection meeting the outside of the bar *a*, as shown in the several figures, to leave the inside of the arm free from obstructions that would impede the stretching of the cloth by the roller.

The application of the pin or journal of the roller to the cap or cover, pivoted on the bar, enables the roller and trough *j* to be separated for the insertion of the cloth, the parts being turned to the position shown in dotted lines, Figs. 3 and 4. To hold the roller and trough together in operative position, an automatically-locking bolt or latch, *k*, is applied to the cap or cover, and its end is adapted to enter a hole in the trough, or its support.

In Figs. 1 and 9 the bolt is shown as arranged vertically in the cap or cover, and adapted to enter an opening in the trough, or support thereof, and when the bolt is within the opening in the trough, the roller and trough cannot be separated, but when the bolt is raised from the recess, the said parts may be readily separated. The bolt, provided with the shank and with a knob, at top, also serves, after being extracted from the recess, as a means to enable a person to raise the cover without danger of injury to the fingers from the spurs or dents of the toothed cylinders.

In Figs. 7 and 8 the bolt, or latch *k* is arranged to turn on a pivot, *l*, and to fit a notch or recess in the trough, or its support. The trough is cast in one piece with the sliding bar. By one upward pull of the bolt, one can release or unlock the cover, and raise it and the rollers from the cloth extended across the trough.

The screw-journal of the temple at the right has its head arranged against the outer end of its cover, the screw portion being screwed into the inner end or part of such cover, but with the other, or left-hand temple, the head of the journal is against the inner end of the cover, and the screw is screwed into the opposite end of it, the screws, while being screwed into their sockets, being turned in the direction of the movement of the cloth while being woven.

This arrangement of the heads and screws of the journals admits of their being made exactly alike—that is, with what are termed right-threaded screws; otherwise, were the heads of the two spindles at the outer ends of their covers, the screw of one would have to be a right-threaded, and that of the other a left-threaded, in order to prevent one of the screws from being liable to be unscrewed by the roller while being revolved by the cloth passing through the temple.

This arrangement of the screw and heads of the journals of the two temples prevents the screws from being turned by the action of the cloth.

With the roller and cover movable on a hinge relatively to the trough, as described, either the application of the cloth to the temple or its removal therefrom can be greatly facilitated, in comparison to what would be the case were the cover rigidly fixed to the trough so as to be incapable of being raised therefrom otherwise than by first unscrewing one or more fastening-screws, used to confine the cover to the trough.

I claim—

1. In a roller-temple adapted to be moved by the lay, as described, and provided with a trough, a cap, and a toothed roller, the combination of the cap and toothed roller and trough, adapted to be separated for the insertion of the cloth, with an automatically-locking bolt, to confine the trough and roller in operative position, substantially as set forth.

2. The sliding bar and its connected trough, in combination with the roller and its cap and projection *i*, pivoted to the outer side of the bar, as and for the purpose described.

3. The bolt, constructed substantially as described, and combined with the cover and trough, to serve as a bolt and as a lifter for the cover, as set forth.

WARREN WHITNEY DUTCHER.

Witnesses:
EBEN O. BANCROFT,
FRANK J. DUTCHER.